(12) United States Patent
Delpiano et al.

(10) Patent No.: US 6,389,202 B1
(45) Date of Patent: May 14, 2002

(54) METHOD OF AND A DEVICE FOR COUPLING OPTICAL FIBERS AND OPTO-ELECTRONIC COMPONENTS

(75) Inventors: Franco Delpiano, Collegno; Luca Pesando, Bussoleno, both of (IT)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/514,210

(22) Filed: Feb. 28, 2000

(30) Foreign Application Priority Data

Mar. 3, 1999 (IT) ........................... TO99A0159

(51) Int. Cl.[7] .............................. G02B 6/36
(52) U.S. Cl. ...................... 385/49; 385/14; 385/88; 385/89; 385/92
(58) Field of Search .................. 385/49, 88–94, 385/14, 65, 83

(56) References Cited

U.S. PATENT DOCUMENTS

| | | | | |
|---|---|---|---|---|
| 5,764,832 A | * | 6/1998 | Tabuchi | 385/49 |
| 5,786,925 A | * | 7/1998 | Goosen et al. | 359/245 |
| 5,872,880 A | * | 2/1999 | Maynard | 385/88 |
| 6,205,274 B1 | * | 3/2001 | Zhou | 385/38 |
| 6,264,377 B1 | * | 7/2001 | Mitsuda et al. | 385/88 |

* cited by examiner

Primary Examiner—Hemang Sanghavi

(57) ABSTRACT

In the fiber and in any fiber (F), a reflecting surface (F1) is created that is generically tilted with respect to the main propagation path (T1) of the optical radiation in said fiber, so as to originate by reflection an additional propagation path (T2) that is generically deflected with respect to said main propagation path (T1). In a mounting support (2) common to the fiber (F) and the related opto-electronic component (O), a groove is made along an external face (2a) so as to accomodate the optical fiber (F) in a tight condition. The groove (3) is then covered through a laminar cover, that is transparent to the radiation and has a flat surface (4a).

The fiber (F) is inserted into said groove in order that said deflected propagation path (T2) passes through said cover (4) of material transparent to the radiation, and the opto-electronic component (O) is mounted on said cover (4) in alignment with said deflected propagation path (T2).

13 Claims, 1 Drawing Sheet

METHOD OF AND A DEVICE FOR COUPLING OPTICAL FIBERS AND OPTO-ELECTRONIC COMPONENTS

TEXT OF THE DESCRIPTION

The present invention faces in principle the problem of performing the coupling between optical fibres and opto-electronic components, in particular transmitters and/or receivers of the optical signal sent into the fibre.

More specifically, the present invention relates to a method of coupling optical fibres and opto-electronic components, according to the preamble of claim 1. A method of this kind is known for instance from the paper by Holger Karstensen et alii "Parallel Optical Link (PAROLI) for Multichannel Gigabit Rate Interconnections" presented at the 1998 Electronics Components and Technology Conference and published on the relating proceedings, pages 747 to 754.

The main drawback of that solution according to the state of the art is due to the intrinsic difficulties of obtaining, in a simple, fast and reliable way, a precise coupling between the optical fibres (usually arranged in a multifibre ribbon cable) and the opto-electronic component (typically formed, in the case of a transmitter, by a Vertical Cavity Surface Emitting Laser (VCSEL) or, in the case of a receiver; by a structurally equivalent device. In practice, the known method envisages that the coupling must be performed by maximising the optical power coupled between the opto-electronic device and the fibre during the assembling operation (active alignment).

On this respect it must also be considered that the opto-electronic component (whether a transmitter or a receiver) is usually associated to a driving/processing circuit, which should be seen as advantageously integrated with the rest of the device.

The present invention aims at providing a solution that, on one hand, does away with the drawbacks of the known technique, and allows, on the other, to easily achieve the integration targets which have been previously mentioned.

According to this invention, said aim is achieved by virtue of a method having the additional characteristics recalled in claim 1. The invention also concerns the relating device.

Figure 1:
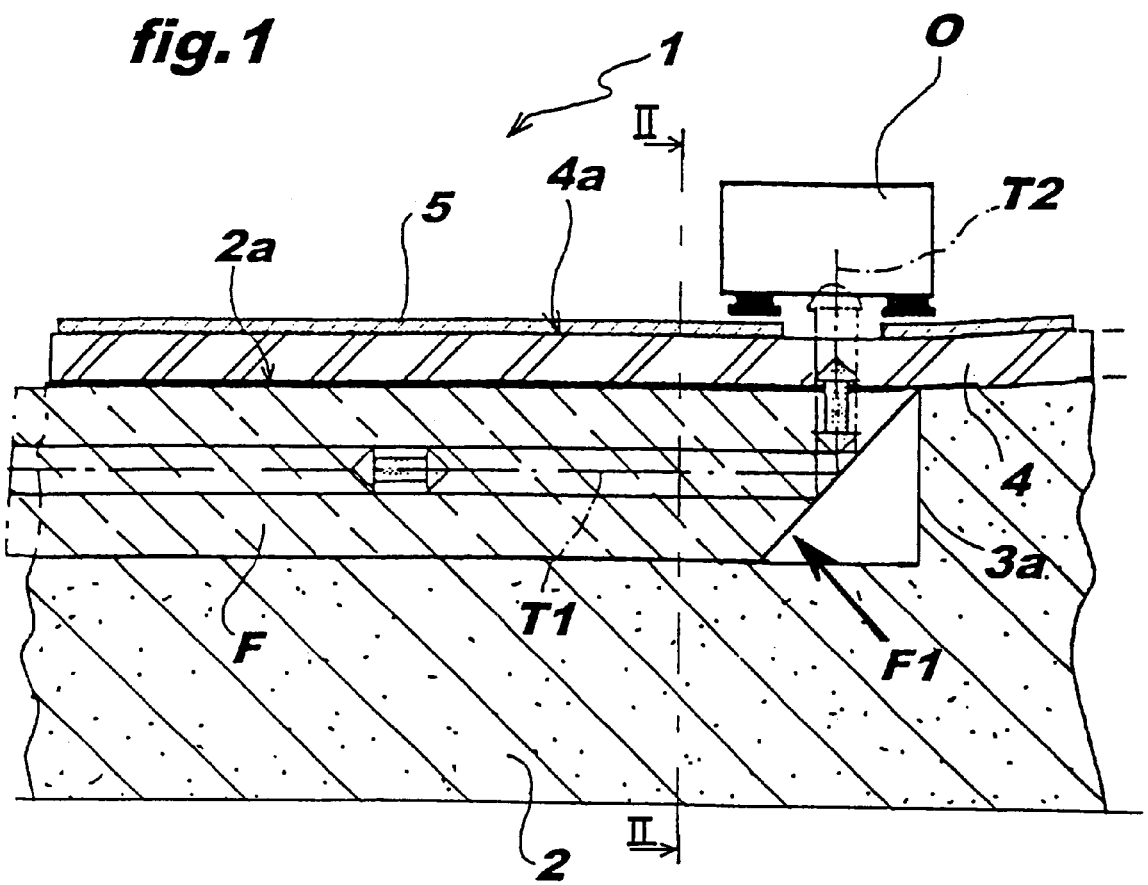
Figure 2:
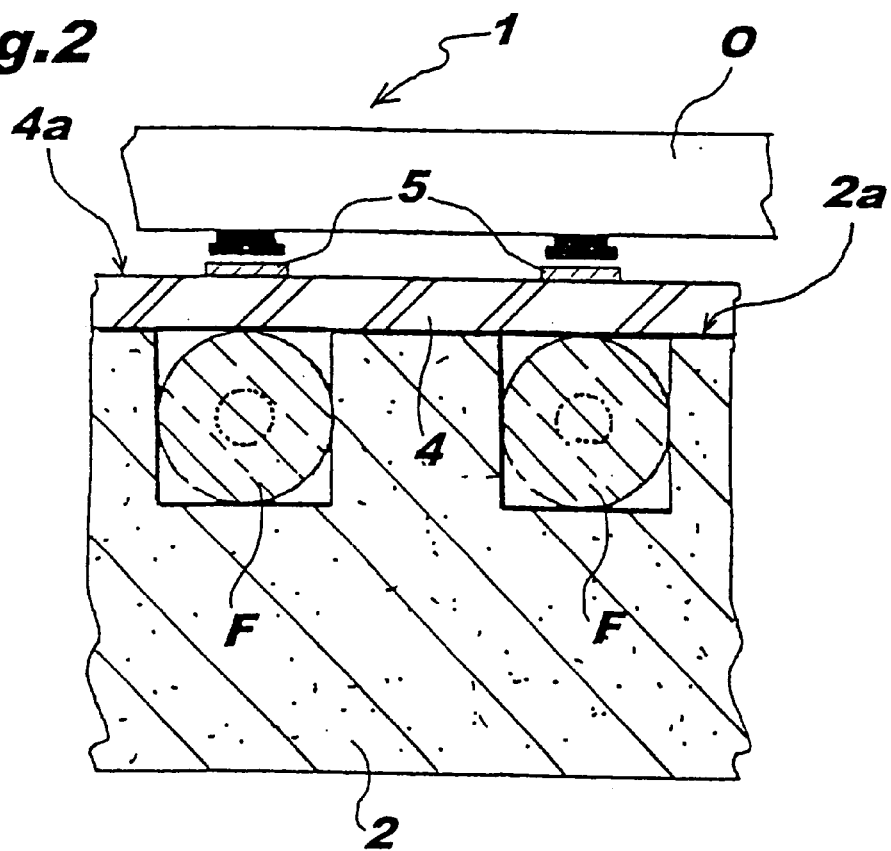

The invention will be now described purely by means of a non limiting example, with reference to the attached drawings, wherein:

FIG. 1 is a general view in longitudinal section of a device according to the invention;

FIG. 2 essentially represents a cross section according to the line II—II of FIG. 1.

In the drawings, reference number 1 shows as a whole the so called optical bench or microbench SiOB (Silicon Optical Bench). It is in general a device designed to allow the optical coupling between one or more optical fibres F and a corresponding set of opto-electronic devices O.

As already mentioned in the introduction of this description, the device 1 is capable of being used both in the transmitter and in the receiving module of an optical fibre link.

In the first case (to which—purely by way of example—a more detailed reference will be made in the sequel), the component O is formed by an optical source such as, for instance, a vertical cavity surface emitting laser, VCSEL, driven by means of respective electric input signals to originate respective optical output signals, injected into the fibres F.

In the latter case, instead, the component O is an electro-optic converter and can then comprise, for instance, an array of photodiodes or phototransistors designed to convert the optical signals arriving on the fibres F into outgoing electric signals.

In the attached drawings, the device 1 is depicted as a portion of a set capable of allowing—according to a general modularity diagram—the coupling of any number of fibres F.

Even if the example shown in the previous drawings envisages the presence of two fibres F, this choice may in no way be regarded as binding. The number of fibres F, i.e. the number of the channels of the device 1, may be any. As a reference, the experiments carried out so far by the applicant have involved devices 1 capable of being used for the implementation of the following receivers/transmitters groups:

a single channel receiver with an InGaAs detector on both multimode and singlemode fibres, a 10 channel receiver with an array of InGaAs detectors on multifibre cables of both single mode and multi-mode fibres, a 10 channel receiver with an array of InGaAs detectors with responsivity optimised in the first window with multimode multifibre cables, and a 10 channel transmitter with an array of vertical cavity surface emission lasers (VCSEL) on multimode multifibre cables.

Both the fibres and the opto-electronic components mentioned here are of well-known type, commonly available on the market. The nature and the features of such components are not however significant for understanding this invention, which makes it unnecessary to provide here a further detailed description.

Equally known (in particular from the article mentioned in the introductory part of this description) is the general criterion adopted to allow the coupling (both at the transmission and reception of the optical signal) between the fibre F and the components O.

In particular it is provided that the or any fibre F is subjected, along the end to be coupled to the device 1, to a cutting operation at 45° with respect to the main longitudinal axis, followed by an operation of lapping and aluminium deposition (or similar processes) designed to originate an end face F1 tilted in such a way as to reflect (and deflect) the optical radiation.

For instance, the radiation travelling through the fibre (from left to right, making reference to the observation point of FIG. 1) along the path T1 identified by the main longitudinal axis of the fibre F reflects on the face F1 and comes out from the fibre along the propagation path T2, which is orthogonal with respect to the path T1. All this also involves the possibility of arranging the component O (here acting as a receiver) in alignment with the path T2.

In a dual way (in the operation as a transmitter), the optical radiation outgoing (vertically and from the top towards the bottom making reference to the observation point of FIG. 1) from the component O along path T2 reflects on the face F1, so as to be deflected by 90° and to propagate in the fibre F along the path T1.

In the exemplary embodiment depicted here, the device 1 according to the invention is essentially formed by a silicon substrate of the same thickness, for instance 400 $\mu$m, designed to act as the support for the common mounting of the fibres F and the components O.

In the substrate 2 in adjacency to one of the two faces (the upper outside face indicated by 2a with reference to the attached drawings) one or more grooves 3 are obtained, each of them is designed to accommodate in its inside a respective fibre F with an adequate accuracy (i.e. in a tight condition).

Each of the grooves 3 preferably exhibits a square cross section with a depth of about 126 $\mu$m, which has been machined with a high accuracy (tolerances of ±1 $\mu$m also horizontally).

These grooves can be fabricated following accurate profiles with vertical sides through plasma ion etching. The relating technology as well as the specific modalities for making the grooves 3 are well known in the technique and do not require to be described in detail in this context. It is usually a sequence of operations which comprises the application of a photoresist mask, the exposure of the same through a photolithographic technique, the selective removal of the photoresist parts corresponding to the etching zones, the ion beam etching of the zones left uncovered by the photoresist and the removal of the photoresist residual.

It must however be stressed that the above cited dimension values are purely indicative, since in other exemplary embodiments carried out by the Applicant, grooves 3 have been fabricated (for instance 10 in number) with sides of 125+1/0 $\mu$m, reciprocally parallel, with a constant separation pitch, equal to 250 $\mu$m, according to the industrial standards relating to the fibre ribbons and to the arrays of emitters or detectors.

Reference number 4 indicates a glass coating (typically silicon glass, i.e. Si O 2) applied on face 2d of the substrate 2 as a cover of the grooves 3. The layer 4 is preferably connected through anodic soldering and thinned to a thickness which advantageously is of the order of 100 $\mu$m or less.

The glass layer acts in practice as a cover for the groove or grooves 3. Each groove 3 defines in this way a channel capable of receiving at its inside a respective fibre F in a condition of high alignment accuracy. This is provided in the longitudinal direction with respect to the groove 3 (in particular concerning the positioning of the upper part of the face F1 of the fibre meeting the end wall 3a of the groove) as well as in the orientation of the fibre around its longitudinal axis: said orientation, in the event of more fibres connected in a ribbon cable, being assured with a high accuracy, in a practically automatic manner, just as a result of the simultaneous execution of the cutting and lapping operation, destined to form the previously described face F1.

The glass layer 4 also forms, with its outside face 4a, opposite to the face 2a, a flat and smooth surface, without surface roughness, which allows the mounting of the components O in the desired alignment condition.

In particular, the flatness of the external face 4a of the glass layer 4 allows creating on the same the areas 5 (and the relating connections) which allow the mounting of the components O, in particular by a technique called reflow welding (also commonly called "flip-chip bonding"). This technique allows, among other things, the fabrication of complete circuits, suitable for the hybrid mounting on the optical modules.

In the presence of more fibres F, the component O is usually formed by an array of individual opto-electronic devices, each of them being aligned with a respective groove 3, so as to be coupled to a respective fibre F.

According to a solution not illustrated in the attached drawings, but well known to the man of the art, the substrate 2 and the glass layer 4 that covers it, may be extended also beyond the zone involved by the development of the grooves 3, so as to create surface areas for the implementation (in particular according to the standard manufacturing techniques of hybrid circuits) of the electrical signal driving/processing units associated to the components O. All this is conducive to the obvious relating advantages in terms of general integration with the device 1.

The glass 4 is obviously selected (through a choice which, at least in the majority of its applications, does not appear to be critical) in such a way as to exhibit a high transparency degree with respect to the radiation transmitted between the fibre F and the components O.

While the principle of the invention remains unchanged, the construction details and the embodiments may be widely varied with respect to what is described and illustrated herein, without thereby departing from the scope of the present invention.

This holds true in particular but not exclusively for the coupling between the fibre(s) F and the component(s) O, a deflection mechanism of the optical radiation according to different angles with respect to the 45/90° angles to which reference has been made in the previous description (for example, a total reflection mechanism).

What is claimed is:

1. A method of coupling an electro-optic component to an optical fiber comprising the steps of:
    (a) forming at least one groove in a support adapted to tightly receive an optical fiber at least over an entire length of a region thereof so that said groove has an open side at a substantially flat face of said support;
    (b) producing a reflecting surface on said optical fiber which is inclined to a main path of propagation along a longitudinal axis of said fiber and capable of reflecting optical radiation arriving along said path into a direction along a transverse axis transverse to said path or optical radiation arriving along said transverse axis into said path;
    (c) fitting said length of said optical fiber tightly and completely into said groove so that said surface directs optical radiation through said open side or receives optical radiation from said open side;
    (d) bonding a laminar cover transparent to said optical radiation to said face so as to lie across said open side of said groove and along a flank of said optical fiber; and
    (e) bonding said optical component directly to said laminar cover in alignment with said transverse axis whereby optical radiation along said transverse axis passes through said laminar cover.

2. The method defined in claim 1 wherein said transverse axis is substantially orthogonal to said longitudinal axis.

3. The method defined in claim 1 wherein said groove is etched in said support and said support is a silicon based support.

4. The method defined in claim 1 wherein a plurality of said grooves are formed in mutually parallel relationship with a constant separation pitch in said support and respective optical fibers are fitted into each of said grooves.

5. The method defined in claim 1 wherein said lamina cover is formed of a silicon glass and is applied to said support by anodic soldering, said covering having a thickness of the order of 100 $\mu$m and said component being applied by reflow soldering.

6. A method of coupling an electro-optic component to an optical fiber comprising the steps of:
    (a) forming at least one groove in a support adapted to tightly receive an optical fiber at least over an entire length of an end thereof so that said groove has an open side at a substantially flat face of said support;

(b) producing a terminal end reflecting surface on said length of optical fiber which is inclined to a main path of propagation along a longitudinal axis of said fiber and capable of reflecting optical radiation arriving along said path into a direction along a transverse axis transverse to said path or optical radiation arriving along said transverse axis into said path;

(c) fitting said length of said optical fiber tightly and completely into said groove so that said surface directs optical radiation through said open side or receives optical radiation from said open side;

(d) bonding a laminar cover transparent to said optical radiation to said face so as to lie across said open side of said groove and along a flank of said optical fiber; and (e) bonding said optical component directly to said laminar cover in alignment with said transverse axis whereby optical radiation along said transverse axis passes through said laminar cover.

7. The method defined in claim 6 wherein said reflecting surface is formed by cutting said optical fiber at an angle of 45°, lapping the resulting cut surface and applying an aluminum coating to the lapped cut surface.

8. A method of coupling an electro-optic component to an optical fiber comprising the steps of:

(a) forming at least one groove in a one-piece laminar support adapted to tightly receive an optical fiber at least over an entire length of a region thereof so that said groove has an open side at a substantially flat face of said support;

(b) producing a totally reflecting terminal end surface on said optical fiber which is inclined to a main path of propagation along a longitudinal axis of said fiber and capable of reflecting optical radiation arriving along said path into a direction along a transverse axis transverse to said path or optical radiation arriving along said transverse axis into said path;

(c) fitting said length of said optical fiber tightly and completely into said groove so that said surface directs optical radiation through said open side or receives optical radiation from said open side;

(d) bonding a laminar cover transparent to said optical radiation to said face so as to lie across said open side of said groove and along a flank of said optical fiber; and (e) bonding said optical component directly to said laminar cover in alignment with said transverse axis whereby optical radiation along said transverse axis passes through said laminar cover.

9. A method of coupling an electro-optic component to an optical fiber comprising the steps of:

(a) forming at least one groove in a support adapted to tightly receive an optical fiber at least over an entire length of a region thereof so that said groove has an open side at a substantially flat face of said support;

(b) producing a reflecting surface on said optical fiber which is inclined to a main path of propagation along a longitudinal axis of said fiber and capable of reflecting optical radiation arriving along said path into a direction along a transverse axis transverse to said path or optical radiation arriving along said transverse axis into said path;

(c) fitting said length of said optical fiber tightly and completely into said groove so that said surface directs optical radiation through said open side or receives optical radiation from said open side;

(d) bonding a laminar cover transparent to said optical radiation to said face so as to lie across said open side of said groove and along a flank of said optical fiber;

(e) bonding said optical component directly to said laminar cover in alignment with said transverse axis whereby optical radiation along said transverse axis passes through said laminar cover; and (f) mounting ancillary circuit elements for said optical component on said cover to integrate said circuit elements with said optical component on said support and cover.

10. An electro-optical device comprising:

a support of a silicon based material formed with a flat face and at least one groove received in said support and having an open side at said flat face;

an optical fiber having a reflecting surface at a terminal end thereof inclined to a longitudinal axis of said fiber and capable of totally reflecting optical radiation arriving along said optical fiber into a direction along a traverse axis substantially orthogonal to said longitudinal axis or optical radiation arriving along said traverse axis into a path along said longitudinal axis, said fiber being fitted tightly and entirely in said groove over a portion provided with said end so that optical radiation along said traverse axis passes through said open side;

a laminar cover transparent to said optical radiation bonded to said face so as to lie across said open side of said groove and along a flank of said optical fiber whereby optical radiation along said traverse axis passes through said laminar cover; and an electro-optical component bonded directly to said lamina cover in alignment with said transverse axis.

11. The device defined in claim 10 wherein said laminar cover is composed of silicon glass, said cover is of a thickness of the order of 100 μm and is bonded to said support by anodic soldering.

12. The device defined in claim 11, further comprising ancillary circuit connectable to said component and forming an integrated system therewith, said elements being mounted on said cover.

13. The device defined in claim 10 wherein said support has a plurality of said grooves, each of which is provided with a respective optical fiber with a respective said surface and all of which are spanned by said cover, respective electro-optical devices being bonded to said cover and aligned with traverse axes of the respective optical fibers.

* * * * *